US012014718B2

(12) United States Patent
Wang et al.

(10) Patent No.: US 12,014,718 B2
(45) Date of Patent: Jun. 18, 2024

(54) FEEDBACK NOISE REDUCTION METHOD AND SYSTEM, AND EARPHONE

(71) Applicant: GOERTEK INC., Shandong (CN)

(72) Inventors: Ruohui Wang, Shandong (CN); Kai Yu, Shandong (CN); Kai Wang, Shandong (CN)

(73) Assignee: GOERTEK INC., Shandong (CN)

( * ) Notice: Subject to any disclaimer, the term of this patent is extended or adjusted under 35 U.S.C. 154(b) by 468 days.

(21) Appl. No.: 17/442,226

(22) PCT Filed: Jul. 26, 2019

(86) PCT No.: PCT/CN2019/097951
§ 371 (c)(1),
(2) Date: Sep. 23, 2021

(87) PCT Pub. No.: WO2020/199432
PCT Pub. Date: Oct. 8, 2020

(65) Prior Publication Data
US 2022/0189449 A1 Jun. 16, 2022

(30) Foreign Application Priority Data
Apr. 3, 2019 (CN) ........................ 201910266991.0

(51) Int. Cl.
*G10K 11/178* (2006.01)
*H04R 1/10* (2006.01)

(52) U.S. Cl.
CPC .. *G10K 11/17854* (2018.01); *G10K 11/17825* (2018.01); *G10K 11/17875* (2018.01);
(Continued)

(58) Field of Classification Search
None
See application file for complete search history.

(56) References Cited

U.S. PATENT DOCUMENTS

2013/0083938 A1 4/2013 Bakalos et al.
2015/0243271 A1 8/2015 Goldstein
(Continued)

FOREIGN PATENT DOCUMENTS

CN 102625213 8/2012
CN 103843364 6/2014
(Continued)

OTHER PUBLICATIONS

Chinese Office Action issued in Application No. 201910266991.0 dated Dec. 4, 2019.
(Continued)

*Primary Examiner* — Antim G Shah
(74) *Attorney, Agent, or Firm* — HAUPTMAN HAM, LLP

(57) ABSTRACT

A feedback noise reduction method, a feedback noise reduction system, and an earphone are provided. In the method, a channel morphological parameter of an acoustic channel between a microphone and a speaker in a feedback noise reduction system is detected; the feedback noise reduction system is switched from using a first noise reduction filter to using a second noise reduction filter in a case that it is determined that the acoustic channel is in an interfered state based on the channel morphological parameter; and a noise reduction signal is generated by using the second noise reduction filter to cancel a noise signal received by the feedback noise reduction system. A frequency response of the second noise reduction filter in a predetermined frequency band is less than a frequency response of the first noise reduction filter in the predetermined frequency band.

9 Claims, 3 Drawing Sheets

(52) U.S. Cl.
CPC ... *H04R 1/1083* (2013.01); *G10K 2210/1081* (2013.01); *G10K 2210/3026* (2013.01); *G10K 2210/3028* (2013.01); *H04R 2460/01* (2013.01)

(56) References Cited

U.S. PATENT DOCUMENTS

| | | | | |
|---|---|---|---|---|
| 2015/0296297 | A1 | 10/2015 | Hua et al. | |
| 2016/0225388 | A1 * | 8/2016 | Nelke | H04R 3/00 |
| 2016/0267898 | A1 * | 9/2016 | Terlizzi | G10K 11/17885 |
| 2016/0351183 | A1 * | 12/2016 | Gauger, Jr. | G10K 11/17881 |
| 2017/0142522 | A1 * | 5/2017 | Hayashi | G10K 11/17875 |

FOREIGN PATENT DOCUMENTS

| | | |
|---|---|---|
| CN | 104980846 | 10/2015 |
| CN | 107408381 | 11/2017 |
| CN | 108419162 | 8/2018 |
| JP | 2010231869 | 10/2010 |

OTHER PUBLICATIONS

International Search Report issued in PCT/CN2019/097951 dated Dec. 27, 2019.

* cited by examiner

FEEDBACK NOISE REDUCTION METHOD AND SYSTEM, AND EARPHONE

This application is a 371 application of International Patent Application No. PCT/CN2019/097951, titled "FEEDBACK NOISE REDUCTION METHOD AND SYSTEM, AND EARPHONE", filed on Jul. 26, 2019, which claims the benefit of and priority to Chinese Patent Application No. 201910266991.0, titled "FEEDBACK NOISE REDUCTION METHOD AND SYSTEM, AND EARPHONE", filed on Apr. 3, 2019 with the Chinese Patent Office, which are incorporated herein by reference in their entireties.

FIELD

The present disclosure relates to the technical field of noise reduction, and in particular to a feedback noise reduction method, a feedback noise reduction system, and an earphone.

BACKGROUND

According to the active noise control technology based on the principle of sound wave interference, an environmental noise signal is cancelled by using a noise reduction signal, where the noise reduction signal and the environmental noise signal are equal in magnitude and opposite in phase.

In a feedback noise reduction system, a microphone collects a noise signal and a horn signal, and transmits the noise signal and the horn signal to a noise reduction filter. The noise reduction filter performs filtering processing on the sound signals collected by the microphone to generate a noise reduction signal having the same magnitude and opposite phase as the noise signal. The noise reduction signal is played by a speaker, thereby cancelling the noise signal. Therefore, with the feedback noise reduction system, the influence of noise can be effectively reduced, thereby improving the listening effect.

However, the feedback noise reduction system is easily affected by external interference to generate self-excited oscillation. Thus, the horn in the feedback noise reduction system may emit abnormal sounds such as howling or periodic oscillations in a case that the feedback noise reduction system is affected by external interference, resulting in affecting the listening effect.

SUMMARY

According to multiple aspects of the present disclosure, a feedback noise reduction method, a feedback noise reduction system, and an earphone are provided, improving the stability of the feedback noise reduction system, effectively resisting external interference, and thereby ensuring listening effect.

A feedback noise reduction method is provided according to an embodiment of the present disclosure. The method includes: detecting a channel morphological parameter of an acoustic channel between a microphone and a speaker in a feedback noise reduction system; switching the feedback noise reduction system from using a first noise reduction filter to using a second noise reduction filter in a case that it is determined that the acoustic channel is in an interfered state based on the channel morphological parameter; and generating a noise reduction signal by using the second noise reduction filter to cancel a noise signal received by the feedback noise reduction system. A lower frequency response of the second noise reduction filter in a predetermined frequency band is less than a lower frequency response of the first noise reduction filter in the predetermined frequency band.

A feedback noise reduction system is further provided according to an embodiment of the present disclosure. The feedback noise reduction system includes a controller, a first noise reduction filter, a second noise reduction filter and a speaker. The controller is configured to: detect a channel morphological parameter of an acoustic channel between a microphone and the speaker in the feedback noise reduction system, switch the feedback noise reduction system from using the first noise reduction filter to using the second noise reduction filter in a case that it is determined that the acoustic channel is in an interfered state based on the channel morphological parameter, and generate a noise reduction signal by using the second noise reduction filter to cancel a noise signal received by the feedback noise reduction system. A frequency response of the second noise reduction filter in a predetermined frequency band is less than a frequency response of the first noise reduction filter in the predetermined frequency band.

An earphone is further provided according to an embodiment of the present disclosure. The earphone includes the feedback noise reduction system.

A computer readable storage medium storing computer instructions is further provided according to an embodiment of the present disclosure. The computer instructions, when executed by one or more processors, cause the one or more processors to perform the feedback noise reduction method.

In the embodiments of the present disclosure, it may be determined whether an acoustic channel between a microphone and a speaker in a feedback noise reduction system is in an interfered state based on a detected channel morphological parameter of the acoustic channel. The feedback noise reduction system is switched from using a first noise reduction filter to using a second noise reduction filter in a case that the acoustic channel is in the interfered state. Compared with using the first noise reduction filter, the external interference received via the acoustic channel can be better resisted by using the second noise reduction filter. Therefore, with the method according to the embodiments of the present disclosure, in a case that the feedback noise reduction system is affected by external interference, the feedback noise reduction system can be adaptively switched to adopt a second noise reduction filter with which the external interference can be better resisted, improving the system stability of the feedback noise reduction system affected by external interference, and thereby optimizing the listening effect of the user.

BRIEF DESCRIPTION OF THE DRAWINGS

The accompanying drawings described herein are intended to for provide a further understanding of the present disclosure and constitute a part of the specification. The exemplary embodiments of the present disclosure and the descriptions thereof are intended to explain the present disclosure, and are not intended to limit the present disclosure. In the drawings.

DETAILED DESCRIPTION OF EMBODIMENTS

Hereinafter, the technical solutions in the present disclosure are described clearly and completely in conjunction with the embodiments and the accompanying drawings in the embodiments to make the objectives, technical solutions and advantages of the present disclosure clear. It is apparent that the described embodiments are only some rather than all of the embodiments of the present disclosure. All other embodiments acquired by those skilled in the art based on the embodiments of the present disclosure without any creative effort shall fall within the protection scope of the present disclosure.

According to the conventional technology, the listening effect of the user may be affected in a case that the feedback noise reduction system is affected by external interference. To solve the problem in the conventional technology, in the embodiments of the present disclosure, it may be determined whether an acoustic channel between a microphone and a speaker in a feedback noise reduction system is in an interfered state based on a detected channel morphological parameter of the acoustic channel. The feedback noise reduction system is switched from using a first noise reduction filter to using a second noise reduction filter in a case that the acoustic channel is in the interfered state. Compared with using the first noise reduction filter, the external interference received via the acoustic channel can be better resisted by using the second noise reduction filter. Therefore, with the method according to the embodiments of the present disclosure, in a case that the feedback noise reduction system is affected by external interference, the feedback noise reduction system can be adaptively controlled to adopt a second noise reduction filter with which the external interference can be better resisted, improving the system stability of the feedback noise reduction system affected by external interference, and thereby optimizing the listening effect of the user.

The technical solutions according to the embodiments of the present disclosure are described in detail below with reference to the drawings.

Figure 1:
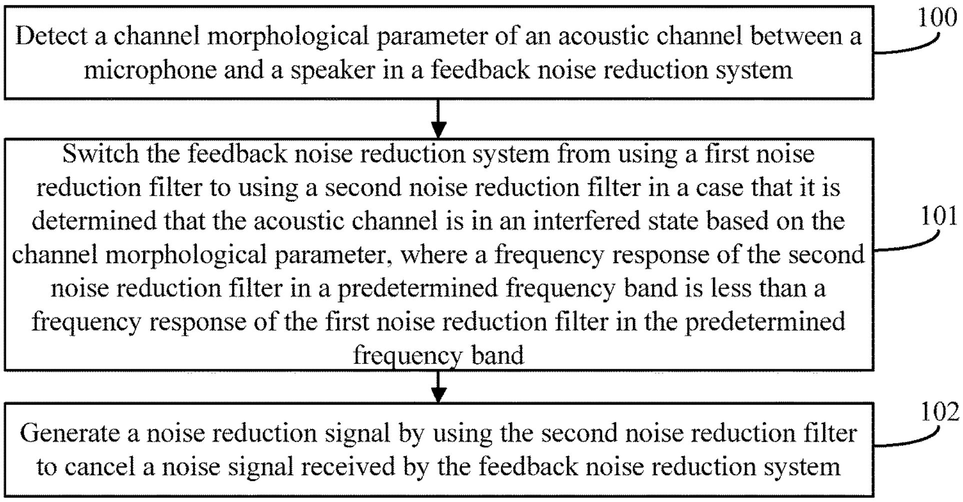
FIG. 1 is a flow chart of a feedback noise reduction method according to an embodiment of the present disclosure.

FIG. 1 is a flow chart of a feedback noise reduction method according to an embodiment of the present disclosure. As shown in FIG. 1, the method includes the following steps 100, 102 and 103.

In step 100, a channel morphological parameter of an acoustic channel between a microphone and a speaker in a feedback noise reduction system is detected.

In step 102, the feedback noise reduction system is switched from using a first noise reduction filter to using a second noise reduction filter in a case that it is determined that the acoustic channel is in an interfered state based on the channel morphological parameter. A frequency response of the second noise reduction filter in a predetermined frequency band is less than a frequency response of the first noise reduction filter in the predetermined frequency band.

In step 103, a noise reduction signal is generated by using the second noise reduction filter to cancel a noise signal received by the feedback noise reduction system.

The feedback noise reduction method according to the embodiment may be applied to a feedback noise reduction system to resist influence of external interference on the feedback noise reduction system. The scenarios in which the feedback noise reduction system is applied are not limited in the embodiment. The feedback noise reduction system may be applied to an earphone noise reduction scenario or a vehicle noise reduction scenario. Apparently, the feedback noise reduction system may be applied to other application scenarios in which it is required to perform feedback noise reduction, which are not limited herein.

The external interference includes, but is not limited to, external force operations, such as a pressing operation and a pinching operation, in the application scenario where the feedback noise reduction system is applied, or changes in the pressure of the environment of the application scenario. For example, in the earphone noise reduction scenario, the external interference may be a pressing operation performed by the user on the earmuff of the earphone.

In the embodiment, it may be determined whether the acoustic channel between the microphone and the speaker in the feedback noise reduction system is in an interfered state based on a detected channel morphological parameter of the acoustic channel.

In a case that the feedback noise reduction system is affected by external interference, the acoustic channel between the microphone and the speaker may change in morphology, thus a channel transfer function of the acoustic channel changes. Then, a gain of a feedback loop corresponding to the feedback noise reduction system may increase to close to 0 dB or even higher than 0 dB, the feedback loop generates self-excited oscillation, high-frequency whistling or low-frequency resonance is generated due to the self-excited oscillation, resulting in that the speaker of the feedback noise reduction system emits harsh whistling or periodic oscillation sound. The feedback loop is a closed loop formed by a microphone, a noise reduction filter and a speaker in the feedback system.

In the embodiment, the external interference to the feedback noise reduction system is determined in time by detecting the morphological change of the acoustic channel between the microphone and the speaker in the feedback noise reduction system. Apparently, in the embodiment, a channel morphological parameter of another acoustic channel in the feedback noise reduction system may be detected, and that whether the feedback noise reduction system is affected by external interference may be determined based on the morphological change of the another acoustic channel, which are not limited herein.

In a case that it is determined that the acoustic channel between the microphone and the speaker in the feedback noise reduction system is in an interfered state based on the channel morphological parameter, the feedback noise reduction system may be switched from using a first noise reduction filter to using a second noise reduction filter. Thus, in the case that the acoustic channel between the microphone and the speaker in the feedback noise reduction system is in the interfered state, a noise reduction signal may be generated by using the second noise reduction filter to cancel a noise signal received by the feedback noise reduction system.

As mentioned above, in the case that the acoustic channel between the microphone and the speaker in the feedback noise reduction system is in the interfered state, the channel transfer function of the acoustic channel changes, and the gain of the feedback loop may increase. To reduce the influence of the change of the acoustic transfer function of the acoustic channel on the gain of the feedback loop, the feedback noise reduction system may be arranged with a first noise reduction filter and a second noise reduction filter in the embodiment.

The first noise reduction filter is designed for achieving a best noise reduction effect of the feedback noise reduction system. Based on the frequency response of the first noise reduction filter, the best noise reduction effect may be achieved in a case that the feedback noise reduction system is in an un-interfered state. Compared with the first noise reduction filter, the second noise reduction filter has a lower frequency response at a predetermined frequency, thus the noise reduction effect based on the second noise reduction filter may be inferior to the noise reduction effect based on the first noise reduction filter. However, compared with the first noise reduction filter, the second noise reduction filter is more suitable for a case in which the feedback noise reduction system is affected by external interference.

In the case that the feedback noise reduction system is affected by the external interference, the change of the channel transfer function of the acoustic channel between the microphone and the speaker in the feedback noise reduction system may be regulated based on the frequency response of the second noise reduction filter in the predetermined frequency band, alleviating the problem of the increased gain of the feedback loop, and thereby avoiding the self-oscillation of the feedback noise reduction system.

The predetermined frequency band may include a frequency band lower than a first predetermined frequency and/or a frequency band higher than a second predetermined frequency, where the second predetermined frequency is greater than the first predetermined frequency. That is, the second noise reduction filter may be configured in a predetermined low frequency band and/or a predetermined high frequency band to achieve a low frequency response. The frequency response may include an amplitude-frequency response and/or a phase-frequency response.

Figure 2A:
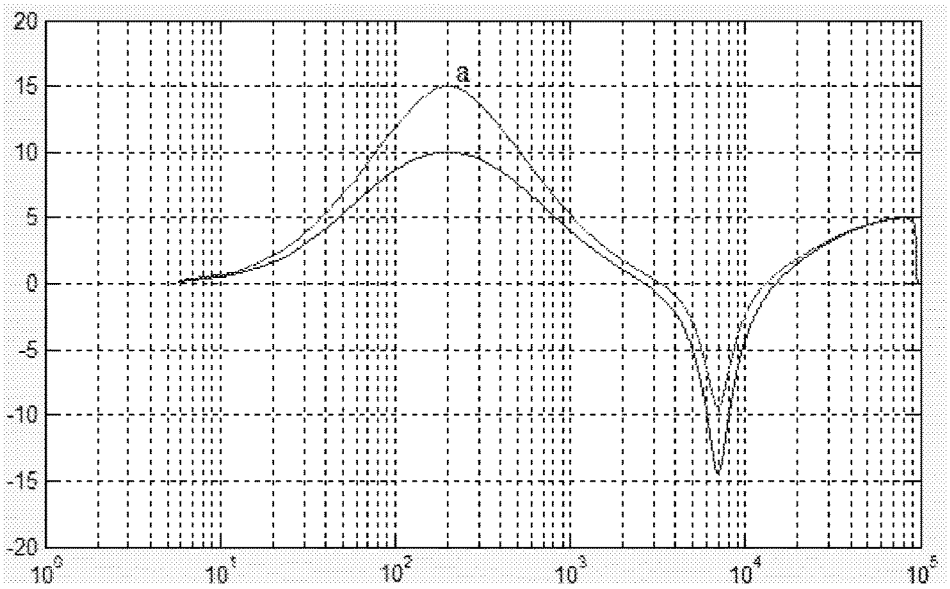
FIG. 2*a* is a schematic diagram showing a comparison of amplitude-frequency responses of a first noise reduction filter and a second noise reduction filter according to an embodiment of the present disclosure.
Figure 2B:
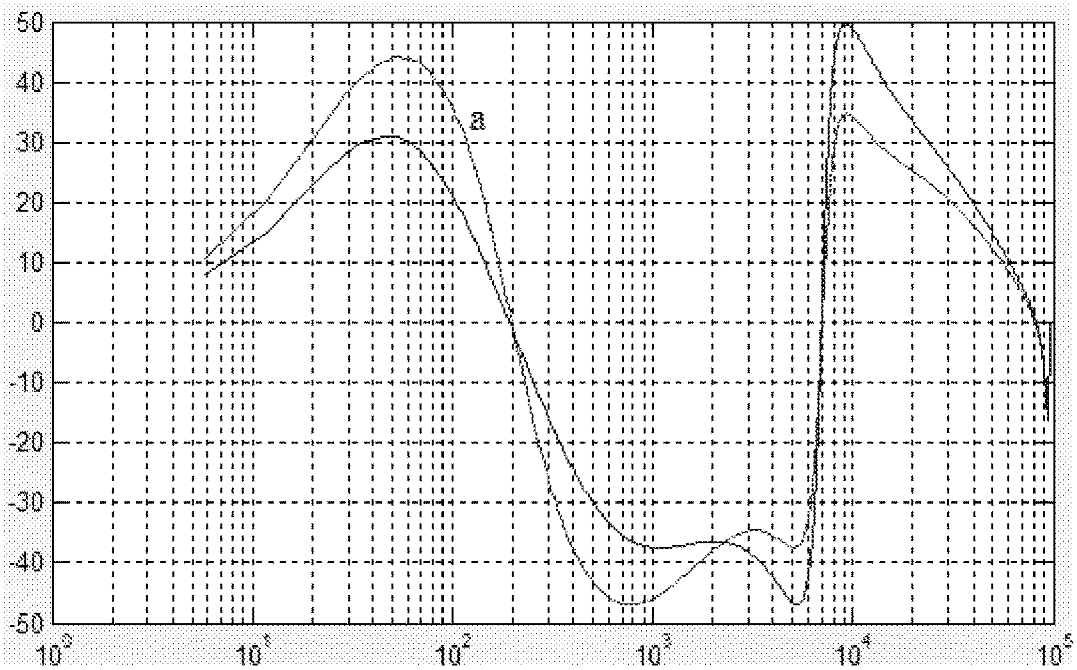
FIG. 2*b* is a schematic diagram showing a comparison of phase-frequency responses of a first noise reduction filter and a second noise reduction filter according to an embodiment of the present disclosure.

FIG. 2a is a schematic diagram showing a comparison of amplitude-frequency responses of a first noise reduction filter and a second noise reduction filter according to an embodiment of the present disclosure. FIG. 2b is a schematic diagram showing a comparison of phase-frequency responses of a first noise reduction filter and a second noise reduction filter according to an embodiment of the present disclosure. As shown in FIG. 2a and FIG. 2b, curve a represents a frequency response of the first noise reduction filter. The first predetermined frequency may be 200 HZ and the second preset frequency may be 1000 HZ. In a frequency band less than 200 HZ, the amplitude-frequency response and the phase-frequency response of the second noise reduction filter are both lower than the amplitude-frequency response and the phase-frequency response of the first noise reduction filter. In a frequency band greater than 1000 HZ, the amplitude-frequency response of the second noise reduction filter is lower than the amplitude-frequency response of the first noise reduction filter. Apparently, the frequency responses shown in FIG. 2a and FIG. 2b are all exemplary, and are not limited herein.

In some practical applications, a double-throw switch may be arranged in the feedback noise reduction system. The switching the feedback noise reduction system from using the first noise reduction filter to using the second noise reduction filter may be performed by controlling the double-throw switch.

In the embodiment, it may be determined whether an acoustic channel between a microphone and a speaker in a feedback noise reduction system is in an interfered state based on a detected channel morphological parameter of the acoustic channel. The feedback noise reduction system is switched from using a first noise reduction filter to using a second noise reduction filter in a case that the acoustic channel is in the interfered state. Compared with using the first noise reduction filter, the external interference received via the acoustic channel can be better resisted by using the second noise reduction filter. Therefore, with the method according to the embodiments of the present disclosure, in a case that the feedback noise reduction system is affected by external interference, the feedback noise reduction system can be adaptively controlled to adopt a second noise reduction filter with which the external interference can be better resisted, improving the system stability of the feedback noise reduction system when receiving external interference, and thereby optimizing the listening effect of the user.

In the foregoing or following embodiments, the channel morphological parameter of the acoustic channel may be continuously detected after switching the feedback noise reduction system from using the first noise reduction filter to using the second noise reduction filter. The feedback noise reduction system is switched from using the second noise reduction filter to using the first noise reduction filter in a case that it is determined that the acoustic channel is in an un-interfered state based on the detected channel morphological parameter. A noise reduction signal is generated by using the first noise reduction filter to cancel the noise signal received by the feedback noise reduction system.

In the embodiment, the channel morphological parameter of the acoustic channel between the microphone and the speaker in the feedback noise reduction system is detected intermittently or continuously, and the un-interfered state of the acoustic channel is determined based on the detected channel morphological parameter. Thus, in the case that the acoustic channel is in the un-interfered state, the feedback noise reduction system is timely switched from using the second noise reduction filter to using the first noise reduction filter, and a noise reduction signal is generated by using the first noise reduction filter, achieving a better noise reduction effect.

It should be noted that in the embodiment, the operation of switching the feedback noise reduction system from using the first noise reduction filter to using the second noise reduction filter may be performed when it is determined that the acoustic channel between the microphone and the speaker in the feedback noise reduction system enters into the interfered state. Apparently, the operation may be performed after the acoustic channel enters into the interfered state for a period of time, which is not limited herein. Similarly, in the embodiment, the operation of switching the feedback noise reduction system from using the second noise reduction filter to using the first noise reduction filter may be performed when it is determined that the acoustic channel enters into the un-interfered state from the interfered state. Apparently, the operation may be performed after the acoustic channel enters into the un-interfered state for a period of time, which is not limited herein.

In the above or the following embodiments, it may be determined whether the acoustic channel between the microphone and the speaker in the feedback noise reduction system is squeezed based on the channel morphological parameter. It is determined that the acoustic channel is in the interfered state in a case that the acoustic channel is squeezed. It is determined that the acoustic channel is in the un-interfered state in a case that the acoustic channel is not squeezed.

In practical applications, the channel morphological parameter of the acoustic channel between the microphone and the speaker in the feedback noise reduction system may be determined as a reference parameter in the case that the acoustic channel is in the un-interfered state. In the operation of the feedback noise reduction system, it may be determined that the acoustic channel is squeezed in a case that it is detected that the channel morphological parameter does not match the reference parameter; and it may be determined that the acoustic channel is not squeezed in a case that it is detected that the channel morphological parameter matches the reference parameter. In addition, the process of determining whether the acoustic channel is squeezed may be intermittent or continuous, which is not limited herein.

In the embodiment, the channel morphological parameter of the acoustic channel between the microphone and the speaker in the feedback noise reduction system may be detected by using a sensor. The sensor may be arranged in the acoustic channel.

The sensor may be an airflow measurement sensor, a deformation sensor or the like, which is not limited herein. In the following, the process of determining whether the acoustic channel is squeezed based on the channel morphological parameter is described by taking the airflow measurement sensor as an example.

In a case of adopting an airflow measurement sensor, the airflow measurement sensor is configured to detect the channel morphological parameter of the acoustic channel. The detected channel morphological parameter includes but is not limited to an airflow rate and an airflow direction. In some practical applications, the acoustic channel may be arranged with a sound venting device, such as a sound venting hole and a sound venting pipe, and the airflow measurement sensor may be arranged at an air inlet/outlet of the sound venting device, which is not limited herein.

When the acoustic channel is squeezed, the volume of the acoustic channel is reduced, the air in the acoustic channel is compressed and pressure in the acoustic channel increases, thus a difference between the pressure inside the acoustic channel and the pressure outside the acoustic channel. Due to the pressure difference, an airflow flowing from the inside of the acoustic channel to the outside of the acoustic channel is generated. The airflow measurement sensor may detect the airflow. In the embodiment, it may be determined that the acoustic channel is squeezed in a case that it is detected that the airflow direction is from the inside of the acoustic channel to the outside of the acoustic channel and the airflow rate increases to be greater than a first predetermined threshold. The first predetermined threshold may be flexibly set, for example, may be set to zero, which is not limited herein.

In the embodiment, the channel morphological parameter of the acoustic channel may be continuously detected after it is determined that the acoustic channel is squeezed, and the deformation process of the acoustic channel from being squeezed to being squeezed to a limit, and then from being released to a state in which the acoustic channel is still not restored to an initial un-squeezed state is determined as the interfered state of the acoustic channel. During the deformation process, the channel morphological parameters corresponding to different deformation time points are different. The channel morphological parameter corresponding to a deformation time point at which the acoustic channel is squeezed has been described above. The channel morphological parameter corresponding to a deformation time point at which the acoustic channel is squeezed to a limit may be an airflow rate equal to zero. The channel morphological parameter corresponding to a deformation time point at which the acoustic channel is released may be an airflow direction from the outside of the acoustic channel to the inside of the acoustic channel. Apparently, the above descriptions are merely exemplary, and are not limited herein After the deformation process, the acoustic channel may be restored to an un-interfered state. In the embodiment, it may be determined that the acoustic channel is not squeezed in a case that it is detected that the airflow direction is from the outside of the acoustic channel to the inside of the acoustic channel and the airflow rate decreases to be less than a second predetermined threshold. The second predetermined threshold may be flexibly set, which is not limited herein.

Therefore, in the embodiment, the switching between the interfered state and the un-interfered state of the acoustic channel between the microphone and the speaker in the feedback noise reduction system may be accurately monitored in the operation of the feedback noise reduction system, and then the first noise reduction filter and the second noise reduction filter in the feedback noise reduction system may be adaptively switched according to the switching between the interfered state and the un-interfered state. Thus, in a case that the feedback noise reduction system is affected by external interference, the influence of the external interference on the feedback noise reduction system can be reduced; and in a case that the feedback noise reduction system is not affected by external interference, a best noise reduction effect can be achieved. Therefore, the listening effect of the user can be improved during the operation of the noise reduction system.

Figure 3:
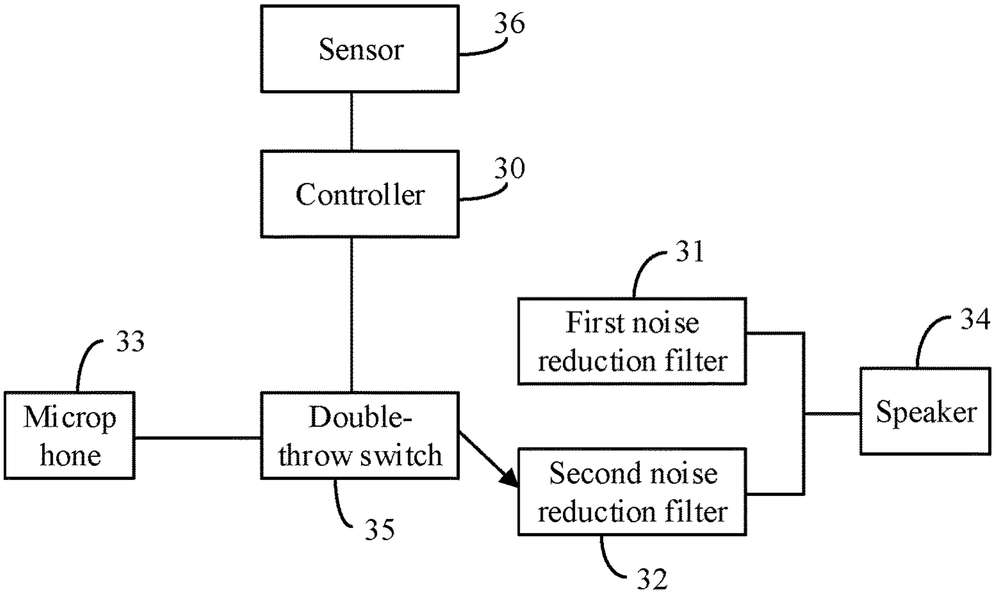
FIG. 3 is a schematic structural diagram of a feedback noise reduction system according to an embodiment of the present disclosure.

FIG. 3 is a schematic structural diagram of a feedback noise reduction system according to an embodiment of the present disclosure. As shown in FIG. 3, the feedback noise reduction system includes a controller 30, a first noise reduction filter 31, a second noise reduction filter 32, a microphone 33 and a speaker 34.

The controller 30 is configured to: detect a channel morphological parameter of an acoustic channel between the microphone 33 and the speaker 34; switch the feedback noise reduction system from using a first noise reduction filter 31 to using a second noise reduction filter 32 in a case that it is determined that the acoustic channel is in an interfered state based on the channel morphological parameter; and generate a noise reduction signal by using the second noise reduction filter 32 to cancel a noise signal received by the feedback noise reduction system. A frequency response of the second noise reduction filter 32 in a predetermined frequency band is less than a frequency response of the first noise reduction filter 31 in the predetermined frequency band.

In practical applications, as shown in FIG. 3, the feedback noise reduction system may be arranged with a double-throw switch 35. The controller 30 may control the double-throw switch 35 to perform switching between the first noise reduction filter 31 and the second noise reduction filter 32. Apparently, the switching between the first noise reduction filter 31 and the second noise reduction filter 32 may be performed by other means such as software control, which is not limited herein.

In some embodiments of the present disclosure, it may be determined whether an acoustic channel between a microphone and a speaker in a feedback noise reduction system is in an interfered state based on a detected channel morphological parameter of the acoustic channel. The feedback noise reduction system is switched from using a first noise reduction filter to using a second noise reduction filter in a case that the acoustic channel is in the interfered state. Compared with using the first noise reduction filter, the external interference received via the acoustic channel can be better resisted by using the second noise reduction filter. Therefore, with the system according to the embodiments of the present disclosure, the switching between the first noise reduction filter and the second noise reduction filter in the feedback noise reduction system can be adaptively performed according to whether the acoustic channel is interfered, effectively resisting external interference in a case that the acoustic channel is affected by the external interference, and thereby optimizing the listening effect of the user.

In an embodiment, the controller 30 is further configured to: detect the channel morphological parameter of the acoustic channel, switch the feedback noise reduction system from using the second noise reduction filter 32 to using the first noise reduction filter 31 in a case that it is determined that the acoustic channel is in an un-interfered state based on the detected channel morphological parameter, and generate a noise reduction signal by using the first noise reduction filter 31 to cancel the noise signal received by the feedback noise reduction system.

In an embodiment, the controller 30 is further configured to: determine whether the acoustic channel is squeezed based on the channel morphological parameter, determine that the acoustic channel is in the interfered state in a case that it is determined that the acoustic channel is squeezed, and determine that the acoustic channel is in the un-interfered state in a case that it is determined that the acoustic channel is not squeezed.

In an embodiment, a sensor 36 is arranged in the acoustic channel. The controller 30 is configured to detect the channel morphological parameter of the acoustic channel between the microphone 33 and the speaker 34 by using the sensor 36.

In an embodiment, the sensor 36 is an airflow measurement sensor for detecting the channel morphological parameter of the acoustic channel. The channel morphological parameter includes an airflow rate and an airflow direction. The controller is configured to determine whether the acoustic channel is squeezed based on the channel morphological parameter by: determining that the acoustic channel is squeezed in a case that the airflow direction is from an inside of the acoustic channel to an outside of the acoustic channel and the airflow rate increases to be greater than a first predetermined threshold; and determining that the acoustic channel is not squeezed in a case that the airflow direction is from an outside of the acoustic channel to an inside of the acoustic channel and the airflow rate increases to be less than a second predetermined threshold.

It should be noted that for the technical details in the embodiments of the feedback noise reduction system, one may refer to the descriptions of the embodiments of the feedback noise reduction method, which are not described in detail herein and shall not cause any loss to the protection scope of the present disclosure.

Figure 4:
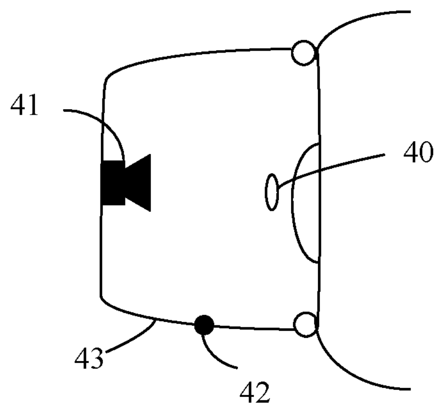
FIG. 4 is a schematic structural diagram of an earphone according to an embodiment of the present disclosure.

FIG. 4 is a schematic structural diagram of an earphone according to an embodiment of the present disclosure. As shown in FIG. 4, the earphone includes the feedback noise reduction system according to any one of the embodiments.

The earphone may be a headphone, an in-ear earphone, a neck-mounted earphone or the like. The product form of the earphone is not limited herein.

As shown in FIG. 4, in addition to the microphone 40 and the speaker 41 in the feedback noise reduction system and the arranged sensor 42 for detecting the channel morphological parameter of the acoustic channel between the microphone 40 and the speaker 41, the earphone according to the embodiment may further include an earmuff 43 and other structural units.

It should be noted that FIG. 4 only shows a basic structure of the earphone, which is not intended to limit the structure of the earphone in the embodiment. It should be understood that any earphone including the feedback noise reduction system according to any one of the embodiments should fall within the protection scope of the present disclosure. In addition, the noise reduction filter, the controller and other structural units may be arranged outside the earmuff 43, in the earmuff or at other positions, which is not limited herein.

A computer readable storage medium storing a computer program is further provided according to an embodiment of the present disclosure. The computer program, when being executed, performs the steps that can be performed by the feedback noise reduction system according to the method embodiments.

It should be noted that the expressions "first", "second" and the like are used herein to distinguish different noise reduction filters, predetermined frequencies, predetermined thresholds and the like, and do not indicate any sequential order or any primary and secondary relation, and is not intended to limit that "first" and "second" represent different types.

Those skilled in the art should understand that the embodiments of the present disclosure may be provided as a method, a system, or a computer program product. Therefore, the present disclosure may be in the form of a complete hardware embodiment, a complete software embodiment, or an embodiment combing software and hardware. Moreover, the present disclosure may be embodied as a computer program product carried on one or more computer available storage media (including, but not limited to, magnetic disk storage, CD-ROM, optical storage, and the like) storing computer available program codes.

The present disclosure is described with reference to flow charts and/or block diagrams of methods, devices (systems), and computer program products according to the embodiments of the present disclosure. It should be understood that each of the flows in the flow charts and/or each of blocks in the block diagrams, and a combination of flows in the flow charts and/or a combination of blocks in the block diagrams can be implemented by the computer program instructions. The computer program instructions may be installed in a general-purpose computer, a dedicated computer, an embedded processor or processors of other programmable data processing devices to generate a machine, such that the instructions executed by the computer or the processors of the other programmable data processing devices generate a device for implementing functions specified in one or more flows of the flow charts and/or one or more blocks of the block diagrams.

The computer program instructions may be stored in a computer readable memory which may direct a computer or other programmable data processing devices to operate in a manner, such that a manufacture including an instruction device is generated based on the instructions stored in the computer readable memory, and the instructions are executed to perform functions specified in one or more flows of the flow charts and/or one or more blocks of the block diagrams.

The computer program instructions may be loaded on a computer or other programmable data processing devices. Then, the computer or other programmable devices perform operation steps to realize the processing performed by the computer, so that the instructions are executed by the computer or other programmable devices to perform functions specified in one or more flows of the flow charts and/or one or more blocks of the block diagrams.

In a typical configuration, the computing device includes one or more processors (CPU), an input/output interface, a network interface, and a memory.

The memory may include a non-permanent memory, a random access memory (RAM) and/or a non-volatile memory, such as a read-only memory (ROM) or a flash memory (flash RAM), in the computer readable medium. The memory is an example of the computer readable medium.

The computer readable medium includes a permanent medium and a non-permanent medium, and a removable medium and a non-removable medium, and information storage may be performed by any method or technology. The information may be computer readable instructions, data structures, program modules, or other data. The computer storage medium, for example, includes but are not limited to: a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory techniques, a CD-ROM, a digital versatile disc (DVD) or other optical storage, a magnetic cassette, a magnetic tape magnetic disk storage or other magnetic storage device or any other non-transmission media, which can store information to be accessed by a computing device. As defined in this specification, a computer readable medium does not include transitory media such as modulated data signals and carrier waves.

It should be noted that, terms "include", "comprise" or any other variants thereof are intended to be non-exclusive. Therefore, a process, method, article or device including multiple elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

The above descriptions are only embodiments of the present disclosure and are not intended to limit the present disclosure. Various modifications and alternations to the present disclosure may be made by those skilled in the art. Any modification, equivalent substitution and improvement made within the spirit and principle of the present disclosure shall be within the scope of claims of the present disclosure.

The invention claimed is:

1. A feedback noise reduction method, comprising:

detecting a channel morphological parameter of an acoustic channel between a microphone and a speaker in a feedback noise reduction system;

switching the feedback noise reduction system from using a first noise reduction filter to using a second noise reduction filter in a case that it is determined that the acoustic channel is in an interfered state based on the channel morphological parameter;

generating a noise reduction signal by using the second noise reduction filter to cancel a noise signal received by the feedback noise reduction system; and determining whether the acoustic channel is squeezed based on the channel morphological parameter;

wherein a frequency response of the second noise reduction filter in a predetermined frequency band is less than a frequency response of the first noise reduction filter in the predetermined frequency band, wherein a sensor is arranged in the acoustic channel, and the detecting the channel morphological parameter of the acoustic channel between the microphone and the speaker in the feedback noise reduction system comprises:

detecting the channel morphological parameter of the acoustic channel between the microphone and the speaker in the feedback noise reduction system by using the sensor, and wherein the sensor is an airflow measurement sensor for detecting the channel morphological parameter of the acoustic channel, and the channel morphological parameter comprises an airflow rate and an airflow direction, and the determining whether the acoustic channel is squeezed based on the channel morphological parameter comprises:

determining that the acoustic channel is squeezed, in response to the airflow direction being from an inside of the acoustic channel to an outside of the acoustic channel and the airflow rate increasing to be greater than a first predetermined threshold; and determining that the acoustic channel is not squeezed, in response to the airflow direction being from the outside of the acoustic channel to the inside of the acoustic channel and the airflow rate decreasing to be less than a second predetermined threshold.

2. The method according to claim 1, further comprising:

detecting the channel morphological parameter of the acoustic channel;

switching the feedback noise reduction system from using the second noise reduction filter to using the first noise reduction filter in a case that it is determined that the acoustic channel is in an un-interfered state based on the detected channel morphological parameter; and generating a noise reduction signal by using the first noise reduction filter to cancel the noise signal received by the feedback noise reduction system.

3. The method according to claim 1, further comprising:

determining that the acoustic channel is in the interfered state in response to the acoustic channel being squeezed; and determining that the acoustic channel is in the un-interfered state in response to the acoustic channel being not squeezed.

4. The method according to claim 1, wherein the predetermined frequency band comprises a frequency band lower than a first predetermined frequency and/or a frequency band higher than a second predetermined frequency, and the second predetermined frequency is greater than the first predetermined frequency.

5. A non-transitory computer readable storage medium storing computer instructions, wherein the computer instructions, when executed by one or more processors, cause the one or more processors to perform the feedback noise reduction method according to claim 1.

6. A feedback noise reduction system, comprising a controller, a first noise reduction filter, a second noise reduction filter, a microphone and a speaker, wherein the controller is configured to: detect a channel morphological parameter of an acoustic channel between the microphone and the speaker, switch the feedback noise reduction system from using a first noise reduction filter to using a second noise reduction filter in a case that it is determined that the acoustic channel is in an interfered state based on the channel morphological parameter, and generate a noise reduction signal by using the second noise reduction filter to cancel a noise signal received by the feedback noise reduction system;

wherein a frequency response of the second noise reduction filter in a predetermined frequency band is less than a frequency response of the first noise reduction filter in the predetermined frequency band, and wherein a sensor is arranged in the acoustic channel, the sensor is an airflow measurement sensor for detecting the channel morphological parameter of the acoustic channel, the channel morphological parameter comprises an airflow rate and an airflow direction, and the controller is configured to determine whether the acoustic channel is squeezed based on the channel morphological parameter by:

determining that the acoustic channel is squeezed, in response to the airflow direction being from an inside of the acoustic channel to an outside of the acoustic channel and the airflow rate increasing to be greater than a first predetermined threshold; and determining that the acoustic channel is not squeezed, in response to the airflow direction being from the outside of the acoustic channel to the inside of the acoustic channel and the airflow rate decreasing to be less than a second predetermined threshold.

7. The feedback noise reduction system according to claim 6, wherein the controller is further configured to:

detect the channel morphological parameter of the acoustic channel;

switch the feedback noise reduction system from using the second noise reduction filter to using the first noise reduction filter in response to determining that the acoustic channel being in an un-interfered state based on a detected channel morphological parameter; and generate a noise reduction signal by using the first noise reduction filter to cancel the noise signal received by the feedback noise reduction system.

8. The feedback noise reduction system according to claim 6, wherein the controller is further configured to:

determine that the acoustic channel is in the interfered state in response to the acoustic channel being squeezed; and determine that the acoustic channel is in the un-interfered state in response to the acoustic channel being not squeezed.

9. An earphone, comprising the feedback noise reduction system according to claim 6.

* * * * *